J. A. READ.
AUTO TIRE.
APPLICATION FILED MAR. 20, 1914.
1,152,906. Patented Sept. 7, 1915.
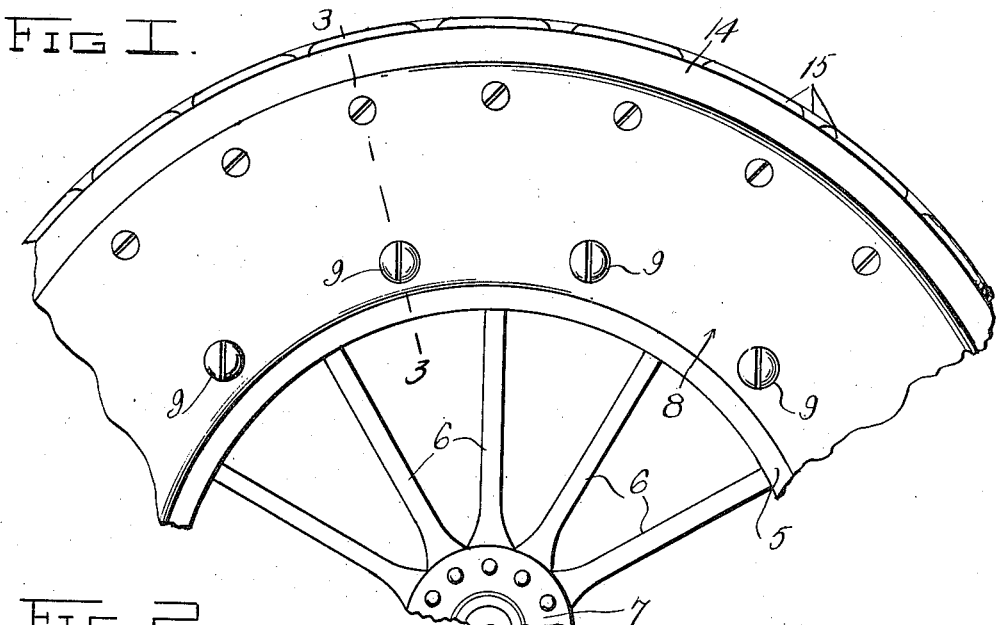
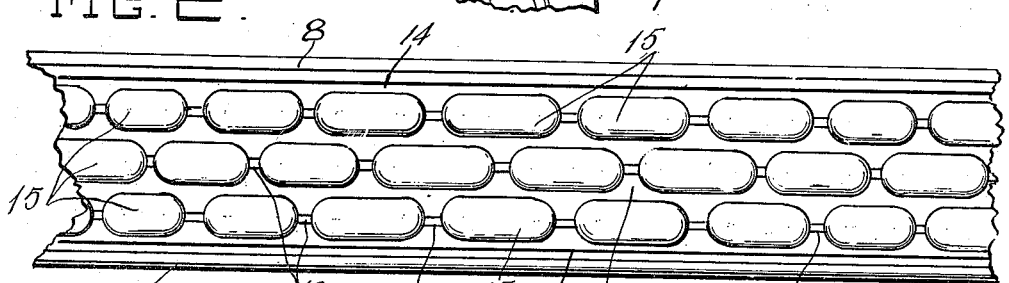
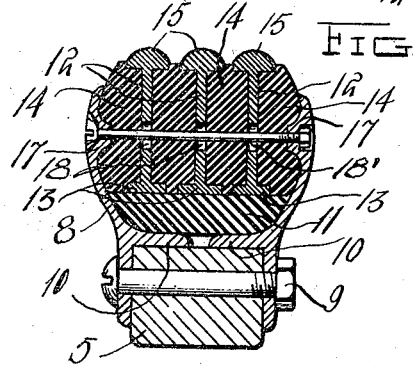
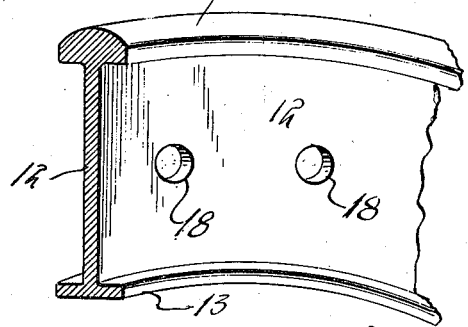
Inventor
J. A. Read.

UNITED STATES PATENT OFFICE.

JAMES A. READ, OF ARLINGTON, NEW JERSEY.

AUTO-TIRE.

1,152,906.  Specification of Letters Patent.  Patented Sept. 7, 1915.

Application filed March 20, 1914. Serial No. 826,084.

*To all whom it may concern:*

Be it known that I, JAMES A. READ, a citizen of the United States, residing at Arlington, in the county of Hudson, State of New Jersey, have invented certain new and useful Improvements in Auto-Tires; and I do hereby declare the following to be a full, clear, and exact description of the invention, such as will enable others skilled in the art to which it appertains to make and use the same.

This invention relates to new and useful improvements in vehicle wheels and particularly that class provided with resilient tire portions.

The object of the present invention resides in the provision of a tire of the class described which presents a non-skid metallic tread surface and which is provided with means interposed between said surface and the felly of the wheel whereby it is resiliently supported.

Another object of the invention resides in the provision of such a tire which possesses full efficiency, which is durable in use and which comprises a minimum number of parts so that it may be manufactured at a comparatively low cost.

A further object of the invention resides in the provision of a resilient tread member which may be applied to a conventional form of felly without slight modification thereof.

With these and other objects in view, the invention resides in the novel combination, formation and arrangement of parts to be hereinafter described and illustrated in the accompanying drawings and particularly pointed out in the claim hereto appended.

Reference is had to the accompanying drawings wherein similar characters of reference designate corresponding parts throughout the several views and in which:

Figure 1 is a fragmentary side elevation of a wheel provided with the improved resilient tread, Fig. 2 is a top plan view of what is shown in Fig. 1, Fig. 3 is a cross sectional view taken on the line 3—3 of Fig. 1, and Fig. 4 is a fragmentary perspective view of one of the tread rings, showing a slight modification.

Referring now more particularly to the accompanying drawings, 5 designates the usual felly of a wheel. Extending inwardly from the felly are the rigid spokes 6 secured to a hub portion 7. For holding the improved tire, annular side plates 8 are provided which are secured on the sides of the felly by bolts 9 passed through said felly and plates. The intermediate portions of the inner faces of the plates have formed thereon inwardly extending annular flanges 10 which seat on the outer periphery of the felly. Disposed on these flanges is an annular band 11 of comparatively soft rubber or other resilient material which forms the resilient element of the tire. The tread members of the tire are in the form of a plurality of annular spaced bands 12 disposed about the band 11 and provided on their inner peripheries with lateral flanges 13 engaging the outer periphery of the said band 11. Disposed between the tread bands 12 and between the outer tread band and the side plates 8 are bands 14 of rubber preferably harder than that composing the band 11. The outer peripheries of the tread bands or rings 12 are preferably provided with projections 15 extending outwardly of the peripheral surface of the rings 14. If desired, however, the outer peripheries of the tread bands may be provided with continuous flanges 16 as shown in Fig. 4.

To hold the tread bands 12 and the bands 14 in relation, alined portions of the side plates 8 are countersunk at 17 and bolts 18' are passed through the plates, through the bands or rings 14 and through relatively large openings 18 in the tread bands or rings 12, the heads of said bolts being seated in recesses in the countersunk portions.

From the foregoing it is observed that when the wheels rest on the ground, the weight falls entirely on the tread bands or rings 12, and these rest through their flanges 13 on the rubber band 11. This rubber band is completely housed, as seen. The tread bands or rings also have a slight lateral resilient movement through the medium of the rubber bands 14. A structure is thus provided which will not skid readily, this advantage being further facilitated by the provision of the projections 15.

What is claimed is:

A resilient wheel comprising the combination with a felly, of side plates secured thereto and provided with annular flanges engaging the periphery of the felly, a band of material of relatively great flexibility disposed about and engaging the flanges, tread rings disposed about and on the said flexible band in parallel relation and having web portions and transversely extending tread portions and base portions, rings of material of relatively slight resiliency disposed between the tread rings and between the outer tread rings and side plates, said tread rings having slots in the web portions extending radially of the wheel, and transverse bolts disposed through the side plates, flexible rings and the said slots of the tread rings.

In testimony whereof, I affix my signature, in the presence of two witnesses.

JAMES A. READ.

Witnesses:
M. F. HALL,
I. V. DORLAND.